United States Patent [19]
Kwok et al.

[11] Patent Number: 5,889,561
[45] Date of Patent: *Mar. 30, 1999

[54] METHOD AND APPARATUS FOR SCALING A COMPRESSED VIDEO BITSTREAM

[75] Inventors: Wilson Kwok, Plainsboro; Joel Walter Zdepski, Belle Mead; Huifang Sun, Cranbury, all of N.J.

[73] Assignee: RCA Thomson Licensing Corporation, Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 334,282

[22] Filed: Nov. 4, 1994

[51] Int. Cl.[6] ..................................................... H04N 7/18
[52] U.S. Cl. ..................... 345/405; 348/404; 348/419; 348/384; 348/387; 348/390
[58] Field of Search ..................... 348/419, 416, 348/415, 405, 404, 420, 413, 411, 384, 402, 403, 387, 409, 390, 406

[56] References Cited

U.S. PATENT DOCUMENTS

| | | | |
|---|---|---|---|
| 5,072,295 | 12/1991 | Murakami et al. | 348/419 |
| 5,073,209 | 12/1991 | Hang | 348/419 |
| 5,231,484 | 7/1993 | Gonzales et al. | 348/405 |
| 5,410,351 | 4/1995 | Kojima | 348/419 |
| 5,410,352 | 4/1995 | Watanabe | 348/405 |
| 5,412,484 | 5/1995 | Yoshikawa | 348/404 |
| 5,426,463 | 6/1995 | Reininger et al. | 348/405 |
| 5,489,943 | 2/1996 | Kutner | 348/405 |
| 5,493,456 | 2/1996 | Augenbraun | 360/64 |
| 5,500,678 | 3/1996 | Puri | 348/405 |
| 5,502,493 | 3/1996 | Meyer | 348/419 |
| 5,541,852 | 7/1996 | Eyuboglu et al. | 364/514 |

*Primary Examiner*—Bryan Tung
*Attorney, Agent, or Firm*—Joseph S. Tripoli; Eric P. Herrmann; Ronald H. Kurdyla

[57] ABSTRACT

A method and apparatus for scaling the bitstream of a compressed video signal includes partial decoding hardware (38, 41) to permit excising of higher frequency AC DCT coefficients or re-quantizing quantized data with a coarser quantization factor. The scaling is performed on a block (macroblock) basis in a manner which linearly scales the amount of compressed data per block. An analyzer (40) generates a profile of cumulative partially decompressed data over a video frame, and bitstream scaling (42) is performed in a manner which insures that a profile of the scaled signal substantially comports with the profile of the original data.

13 Claims, 5 Drawing Sheets

5,889,561

METHOD AND APPARATUS FOR SCALING A COMPRESSED VIDEO BITSTREAM

This invention relates to apparatus for reducing the amount of data in a previously compressed video signal bit stream.

BACKGROUND OF THE INVENTION

The moving picture experts group (MPEG) video coding standard has been proposed for a variety of applications for video transmission and storage. Several applications such as Video On Demand and Trick-Play on Track Digital VTRs, for example, are more easily facilitated with a compressed signal having a lesser bitrate than that provided in certain of the MPEG profiles. The different applications have slightly different signal requirements, however a similar scaling apparatus may serve to reduce an original bitrate to a rate conducive to a respective application.

An MPEG coding standard has now been developed for a variety of applications which include terrestrial high definition television (HDTV), teleconferencing, satellite communication, direct broadcasting systems (DBS) and multimedia workstations. An MPEG-2 compressed bit stream may represent a compressed HDTV bit stream of relatively high data rate. If this signal is to be utilized on relatively narrow band channels it is necessary to reduce or scale its data down to a lower bit rate.

Consider a Video On-Demand system wherein a video file-server includes a storage device containing a library of MPEG encoded bit streams. The bit streams stored in the library are originally coded at a high quality (e.g. studio quality). A number of clients may request retrieval of any of these video programs at one particular time. The number of users and the quality of video delivered to the users is constrained by the outgoing channel capacity. This outgoing channel, which may be a cable bus or an ATM trunk for example, must be shared among the users who are granted service. Different users may require different levels of video quality, and the quality of a respective program will be based on the fraction of the total channel capacity allocated each user.

To simultaneously accommodate a plurality of users, the video file server may scale the stored bit streams to a reduced bit rate before they are delivered over the channel to the respective users. The quality of the resulting scaled bit stream should not be significantly degraded compared to the quality of a hypothetical bit stream obtained by coding the original source material at the reduced rate. Complexity and cost is not a critical factor because only the file server has to be equipped with the scaling hardware, not respective users.

In Trick-play on Track Digital VTR systems, the video is scaled to create a side track on video tape recorders. This side track contains very coarse quality video sufficient to facilitate trick-modes on the VTR (e.g. fast forward and reverse scan at different speeds). Complexity and cost of scaling hardware included in these devices is of significant concern, because the VTR is a mass consumer item subject to mass production.

Another application of scaling is Extended-Play Recording on Digital VTRs. In this application, video is broadcast to users' homes at a certain broadcast quality (~6 Mbps for standard definition video and ~24 Mbps for high definition video). With a scaling feature in their video tape recorders, users may record the video at a reduced rate, akin to extended play, EP, mode on today's VHS recorders, thereby recording a greater quantity of video program material onto a tape at lower quality.

In scaling, the higher quality of the information in the original signal should be exploited as much as possible, and the resulting image quality of the new signal with a lower bit rate should be as high as possible, or as close as possible to one created by coding the original source video at the reduced rate. It is assumed that for a given data rate the original source is encoded in an optimal way.

SUMMARY OF THE INVENTION

The method and scaling apparatus of the present invention includes partial decoding hardware to permit excising of higher frequency AC DCT coefficients or re-quantizing quantized data with a coarser quantization factor. The scaling is performed on a block (macroblock) basis in a manner which linearly scales the amount of compressed data per block. An analyzer generates a profile of cumulative partially decompressed data over a video frame, and scaling is performed to insure that a profile of the scaled signal substantially comports with the profile of the original data.

BRIEF DESCRIPTION OF THE DRAWINGS

The invention will be described with reference to the drawings wherein.

DETAILED DESCRIPTION

Figure 1:
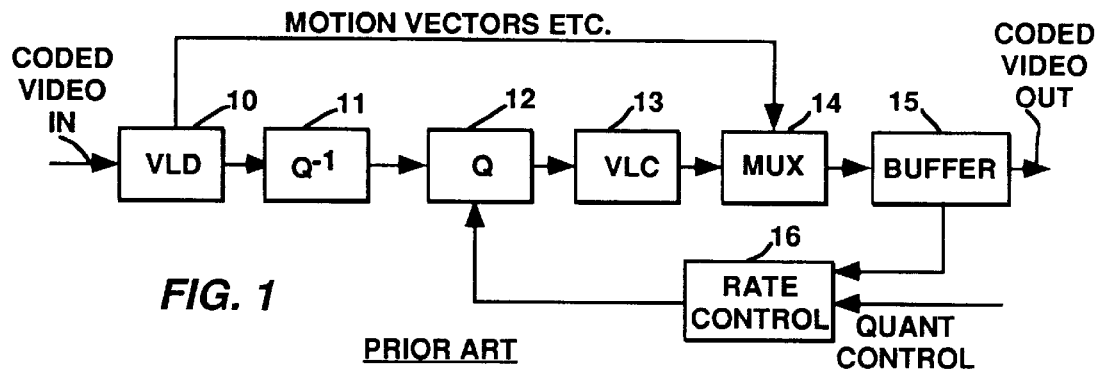
FIG. 1 is a block diagram of a prior art scaling apparatus.

FIG. 1 illustrates a known compressed video signal scaling apparatus for reducing the amount of data in a previously coded video signal. In the illustrated apparatus only the major functional elements are shown to convey the general operation of the circuitry. For example compressed video signal includes various types of data, only some of which types are quantized. The other types are shunted around the re-quantization or scaling apparatus and remultiplexed with the scaled data in the multiplexer 14. It will be apparent to one skilled in the art of compression circuitry that the multiplexer 14 must include not insignificant control circuitry to perform this function. However one skilled in the art of compression circuitry will readily be able to realize the multiplexing function of multiplexer 14, thus it will not be described herein.

In FIG. 1 previously compressed or coded video signal which is to undergo scaling is assumed to be a block coded signal wherein respective pictures are divided into a plurality of blocks or macroblocks, and compressed on a block by block or macroblock by macroblock basis, with the resulting signal occurring, at least in part, as a stream of coded blocks or macroblocks. At least part of the data in respective macroblocks is quantized and variable length encoded. Examples of such a compressed signal are MPEG1 and MPEG2 video signals. The coded signal is applied to a variable length decoder 10 which produces a variable length decoded signal. Motion vectors (and other non-quantized codewords) included in the compressed signal are shown being diverted around the succeeding circuitry ($Q^{-1}$ 11; Q 12; VLC 13), but in fact they may be passed through the succeeding circuitry if such circuitry can be conditioned to be transparent to signal components which should not be altered by the scaling apparatus.

After variable length decoding, the decoded codewords are coupled to an inverse quantizer 11, wherein signal components which were quantized in the compression process are de-quantized. The de-quantized components are re-quantized in a quantizer 12 under the control of a rate controller 16. The rate controller 16 is adjusted to produce coded signal having a bit stream scaled in conformance with the desired reduced rate. Scaling is accomplished in this instance by the rate controller providing quantization values to the quantizer 12 which produce a coarser quantization of respective codewords than the original compressor. The re-quantized codewords are variable length coded in a variable length encoder VLC 13, and reformatted in the multiplexer 14 with signal components which did not undergo re-quantization. The reformatted signal is applied to a rate buffer 15 which, in general, converts a bursty signal to a constant rate signal. The rate buffer includes an occupancy monitor which provides a control signal for controlling the rate buffer to condition the quantizer 12 to provide a constant rate signal. A more detailed description of this circuitry is available in an article, REDUCTION OF THE BIT RATE OF COMPRESSED VIDEO WHILE IN ITS CODED FORM, by D. G. Morrison et al., PV'94, D17.3.

For MPEG compressed video, quantization involves a matrix of quantization values and a quantization factor. The matrix of quantization values are determined according psychovisual parameters. The matrix of quantization values includes a respective value for each DCT coefficient in a block of coefficients representing a block of pixels, and the matrix is normally used in common to quantize all macroblocks in a frame. Quantization factors, on the other hand are macroblock specific, that is each quantizing factor only applies to the macroblock to which it is assigned. The quantizing factors are used to weight all quantizing values in the matrix before the matrix is used to quantize a respective macroblock. In the following description, references to the generation of quantizing parameters are meant in general to apply to the generation of the aforedefined quantizing factors.

The system illustrated in FIG. 1, in general, cannot provide uniform bit scaling over an image due to the variability in the variable length coding. In other words the bit scaling of respective macroblocks may differ by a significant percentage. The bit scaling circuitry of the FIGS. 2 and 4 apparatus does provide substantially uniform bit scaling from macroblock to macroblock.

Figure 2:
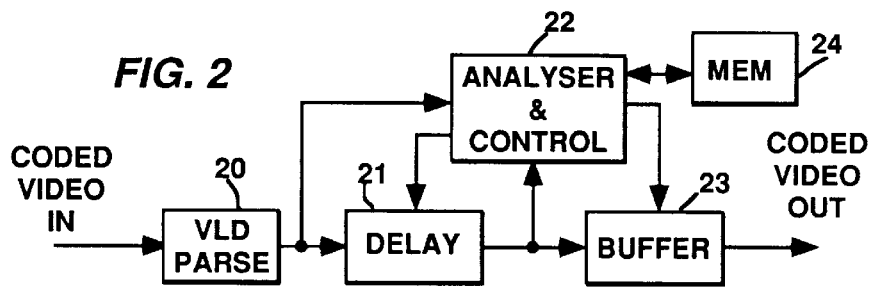
FIG. 2 is a block diagram of a scaling apparatus embodying the present invention.
Figure 6:
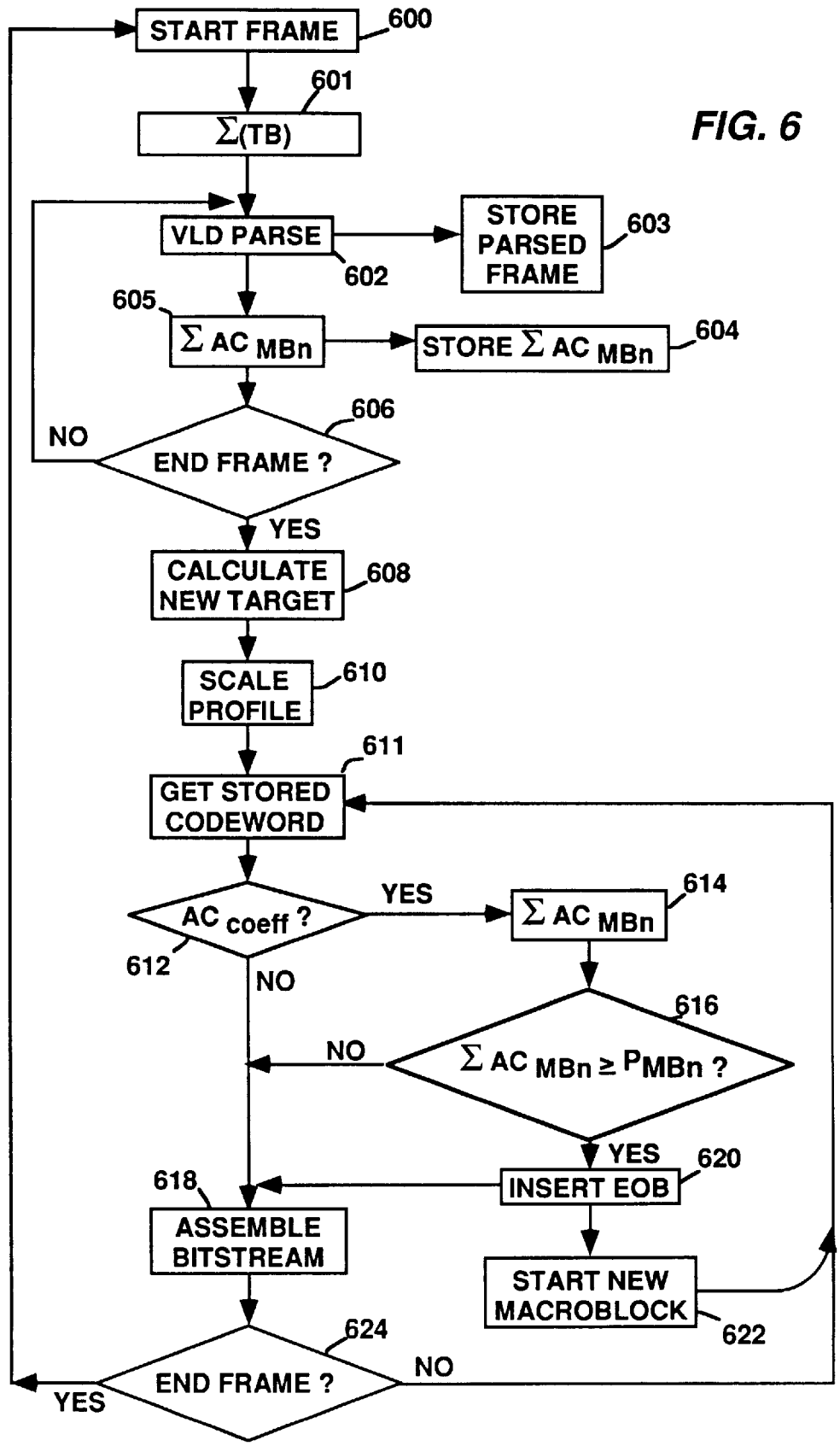
FIG. 6 is a flowchart of the method of operation of the FIG. 2 apparatus.

Refer to FIGS. 2 and 6. In FIG. 2 coded video signal, which is to undergo scaling, is applied to a variable length decoding parser 20. The parser 20 is transparent to codewords which are not variable length coded and passes them unaltered. Variable length coded codewords, in for example an MPEG signal, do not have defined boundaries. The parser 20 determines {602} the boundaries of respective codewords and identifies the codeword by type. The codeword is not actually decoded. The parsed and non-variable length coded codewords are tagged with identifiers and stored {603} in a memory 21.

Figure 3:
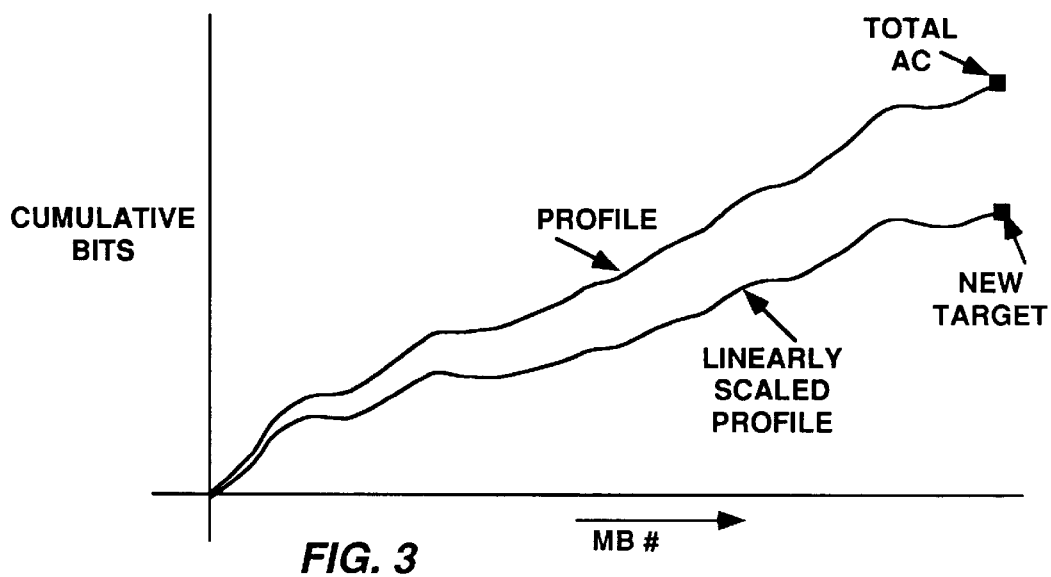
FIG. 3 is a diagram of an exemplary profile of cumulative partially decompressed data representing original and scaled compressed data.

The parsed and non-variable length coded codewords are applied to an analyzer 22. The analyzer 22 develops a profile of, in this example, AC discreet cosine transform (DCT) coefficients versus macroblocks over respective compressed frames (or fields or images etc.). That is, the analyzer generates {605} the running sums of AC DCT coefficient bits on a macroblock basis. The analyzer 22 stores {604} the respective sums identified by macroblock number in a memory 24. For macroblock 1 (MB1), the sum is the sum ($\Sigma$MB1) of all bits in MB1 corresponding to the AC DCT coefficients in MB1. For MB2 the sum is the sum ($\Sigma$MB1) plus the sum ($\Sigma$MB2) of all bits in MB2 corresponding to the AC DCT coefficients in MB2. For MB3 the sum is ($\Sigma$MB1) +($\Sigma$MB2)+($\Sigma$MB3) etc. FIG. 3 illustrates an exemplary graph (designated PROFILE) of such sums with the macroblock number as ordinate.

In addition to the foregoing sums of AC DCT coefficients the analyzer counts {601} all coded bits (TB) for respective frames. After all macroblocks for a respective frame have been analyzed {606}, a target value, $TV_{AC}$, of AC DCT bits per frame is calculated {608} using the sums (TB) and ($\Sigma$MB last), according to the relationship $$TV_{AC} = (\Sigma MB\ last) - \%\ \text{times}(TB) - \text{excess}$$

where ($\Sigma$MB last) is the last of the AC sums and corresponds to the total number of AC DCT bits in the frame, % is the percentage by which the bit stream is to be reduced, and "excess" is the amount by which the previous frame missed the desired target.

The profile of AC DCT bits is scaled {610} by the factor $TV_{AC}/(\Sigma MB\ last)$. Scaling is performed by multiplying each of the respective sums ($\Sigma$MB i) by the factor $TV_{AC}/(\Sigma MB\ last)$ to generate the linearly scaled profile shown in FIG. 3. The respective sums ($\Sigma$MB i) are replaced by the scaled sums in the memory 24.

After the profile has been scaled, the respective parsed and non-variable length coded codewords are accessed from the memory 21 a macroblock at a time. Non AC DCT codewords are passed {612} to a buffer 23, which essentially reassembles {618} the output. The analyzer 22 conditions the memory 21 to pass codewords to the buffer 23, and conditions the buffer 23 to accept a limited amount of codeword bits per macroblock. As the AC DCT codewords are accessed, the bits of the respective AC DCT codewords are summed {614} and the current sum for respective macroblocks is continuously compared {616} with the scaled sum for that macroblock less the number of bits corresponding to an end of block, EOB, codeword. Respective AC DCT codewords are accepted by the buffer 23 until the current sum of macroblock bits is equal to or exceeds the corresponding scaled sum less $EOB_{bits}$. When this condition occurs an EOB code is inserted {620} into the bit stream, and the remaining codewords for the respective macroblock are discarded {622}. This process continues until all coded data for a respective frame is reassembled into the scaled bit stream.

It should be noted that an MPEG macroblock includes, for example, six blocks of data, all of which may include corresponding AC DCT codewords. In processing data from the memory 21, corresponding codewords from each of the blocks within a respective macroblock should be accessed in parallel rather than sequentially so that each block in the macroblock is given equal bit space. Assuming that respective blocks within a macroblock have AC DCT codewords $AC_{ik}$ where i denotes the coefficient(1–64) and k denotes the block (1–6) then codewords should be accessed in the order $AC_{11}$, $AC_{12}$, $AC_{13}$, $AC_{14}$, $AC_{15}$, $AC_{16}$, $AC_{21}$, $AC_{22}$, $AC_{23}$, $AC_{24}$, $AC_{25}$, $AC_{26}$, $AC_{31}$, $AC_{32}$, $AC_{33}$, $AC_{34}$, $AC_{35}$, $AC_{36}$, $AC_{41}$ etc. This requires that the buffer 23 be partitioned on a block basis to permit forming respective blocks in parallel which will then be read sequentially.

Since bits are read from memory 21 up to the point where the number of bits applied to the memory 23 equal the number of AC DCT bits represented by the linearly scaled profile, each of the respective macroblocks will be substantially linearly bit scaled.

Figure 4:
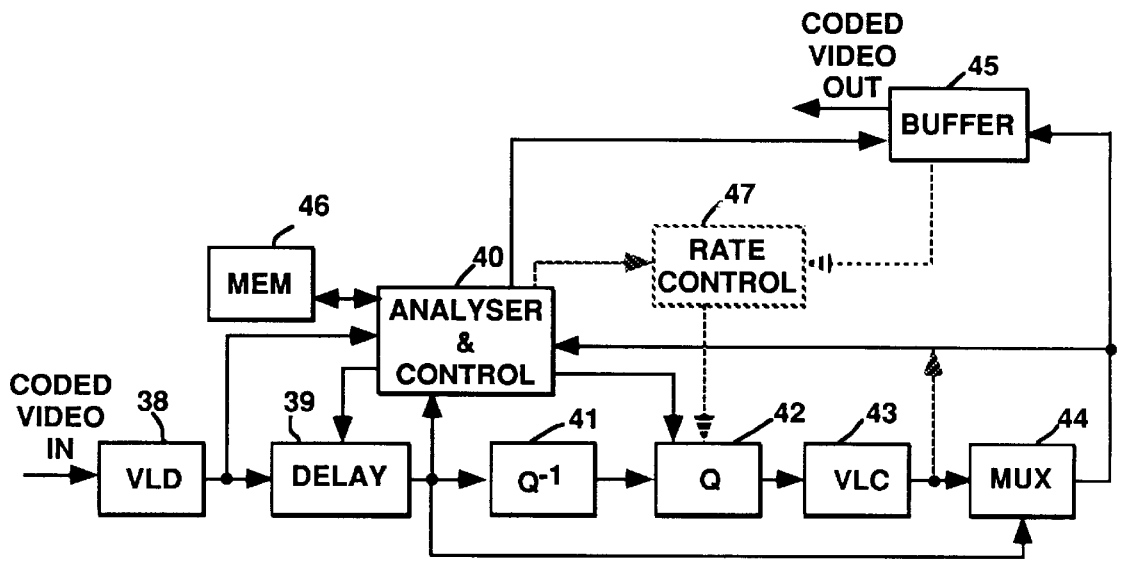
FIGS. 4–5 are block diagrams of alternative scaling apparatus embodying the present invention.

FIG. 4 illustrates a second embodiment which performs bit scaling by re-quantization. Unlike the FIG. 1 apparatus however, the FIG. 4 apparatus performs substantially linear bit scaling of respective macroblocks. In FIG. 4, coded video signal is applied to a variable length decoder 38 which decodes those signal components which are variable length encoded. The decoded signal is applied to a delay memory 39 (which stores the decoded signal until analysis is performed) and to an analyzer 40. The output of the memory 39 is coupled to an inverse quantizer 41. Note that signal components which are not quantized may be shunted around the inverse quantizer 41, which is represented by the arrow from memory 39 to the multiplexer 44, or they may be passed through the inverse quantizer and succeeding circuitry, if the inverse quantizer and succeeding circuitry may be conditioned to be transparent to non-quantized signal components. Note also that the inverse quantizer 41 may be positioned ahead of the delay memory 39 rather than after it.

Inverse quantizer 41 de-quantizes those signal components which are quantized, and applies them to the quantizer 42. Quantizer 42 is conditioned by the analyzer 40, to more coarsely quantize the signal components which are normally quantized, to effect bit stream scaling. The re-quantized signal is applied to a variable length encoder 43 which variable length encodes the signal and applies it to a multiplexer 44 which reformats the signal according to the original protocol or if desired to a different protocol. The reformatted signal is applied to a rate buffer 45.

In one embodiment of the FIG. 4 apparatus, a rate controller 47 (shown in phantom) is employed to control re-quantization. In this embodiment, the analyzer applies control parameters to the rate controller on a frame basis and thereafter the rate controller controls the re-quantization process. The assumption is made that the rate controller is of the type which employs a frame target bit size to generate quantization factors for respective macroblocks. In such rate controllers, the frame target bit size may either be calculated by the rate controller itself or applied from an external source. An example of this type of rate controller is described in U.S. Pat. No. 5,144,424 entitled APPARATUS FOR VIDEO DATA QUANTIZATON CONTROL, by Tristan Savatier. The controller in this patent generates a parameter TSize_i (the index i designates I, B or P frames) which is utilized in calculating respective quantization factors for frame i. For present purposes it is assumed that such a rate controller will be modified to accept a target parameter TSize_i from the analyzer 40.

The analyzer 40, in this instance, extracts the quantization factor $Q_{MBi}$ from respective coded macroblocks and counts the respective bits $MB_i$ for respective macroblocks in the data stream provided by the VLD 38. It forms the product $Q_{MBi}(\Sigma MB_i)$ of the sum of bits times the quantization factor associated with the macroblock. Sums, $\Sigma Q_{MBi}(\Sigma MB_i)_i$, of the products generated for all previous macroblocks for a respective frame are formed for each macroblock and stored in the memory 46 identified by macroblock number; where $\Sigma Q_{MBi}(\Sigma MB_i)_1$ is equal to $Q_{MB1}(\Sigma MB_1)$; $\Sigma Q_{MBi}(\Sigma MB_i)_2$ is equal to $Q_{MB1}(\Sigma MB_1)+Q_{MB2}(\Sigma MB_2)$ etc. These sums plotted against macroblock number form a normalized profile similar to the example illustrated in FIG. 3. Note however that this profile relates to total bits not only AC DCT bits because the rate controller operates on a total bit basis. A profile of AC DCT bits may also be used if the resulting target value is appropriately augmented for the non-quantized signal components. The final sum $\Sigma Q_{MBi}(\Sigma MB_i)_{last}$ is scaled by the factor SF to generate the target value TSize_i which is applied to the rate controller 47 for re-quantizing the current frame. The variable length decoded signal is then accessed from delay memory 39, de-quantized, and re-quantized by quantizer 43 under control of the rate controller 47 utilizing the calculated value of TSize_i. The profile is a normalized curve, but the rate controller operates with a volume of bits, not normalized bits. Thus the scale factor SF is in units of $1/Q_{MB}$ to provide a target in units of bits. An exemplary scale factor SF may be calculated according to the formula $$SF = \frac{(1 - \%)(\Sigma\Sigma_{MBi})_{last} - \text{excess}}{\Sigma(Q_{MBi}(\Sigma MBi))_{last}}$$

where $(\Sigma\Sigma_{MBi})_{last}$ corresponds to the total bits in the respective original frames and excess is the amount of bits in excess of the target value for the previous frame. An alternative scale factor that may be used is the ratio $(1-\%)/Q_{MBiavg}$, where $Q_{MBiavg}$ is the average of all original quantizing factors in the frame.

A further embodiment of FIG. 4 will be described with reference to the flow charts of FIGS. 7 and 8. In this embodiment the analyzer 40 applies quantization factors to the quantizer 42 on a macroblock basis. The rate controller 47 is not used in this embodiment. All of the other elements except the rate controller operate as described above.

Figure 7:
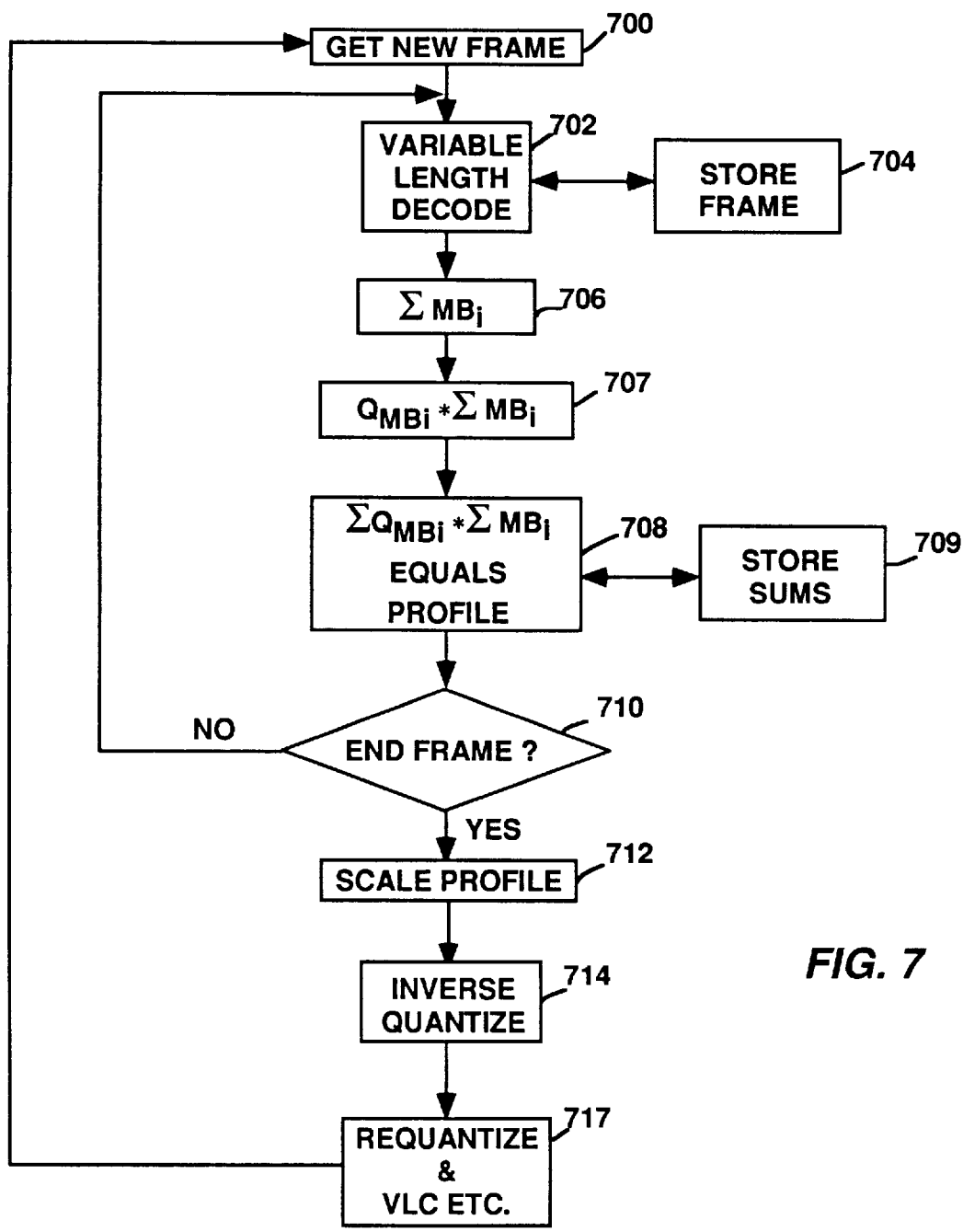
FIGS. 7 and 8 are flow charts useful in understanding the method of operation of the FIG. 4 apparatus.

Referring to FIG. 7 coded video signal is variable length decoded {702} and the decoded signal is stored in the memory 39 and applied to the analyzer 40. The bits of respective macroblocks are summed $\Sigma MB_i$ {706} and then multiplied {707} by the original quantization factor $Q_{MBi}$ associated with the respective macroblock. The products, $Q_{MBi}(\Sigma MB_i)$, are cumulatively summed {708} and stored {709} in the memory 46 identified with respective macroblocks. The accumulated sums $\Sigma(Q_{MBi}(\Sigma MB_i))_i$, when charted with macroblock number as ordinate, form a profile similar to the profiles shown in FIG. 3. When the last macroblock is processed {710}, the profile is scaled {712} by the scaling factor SF as defined above. This is accomplished by multiplying each accumulated sum of products $\Sigma(Q_{MBi}(\Sigma MB_i))_i$, with the scaling factor SF and storing them in the memory 46 identified with respective macroblocks. The decoded video signal in memory 39 is then inverse quantized {714} and re-quantized {717} such that the recoded video signal comports with the scaled profile. This process is illustrated in FIG. 8.

Figure 8:
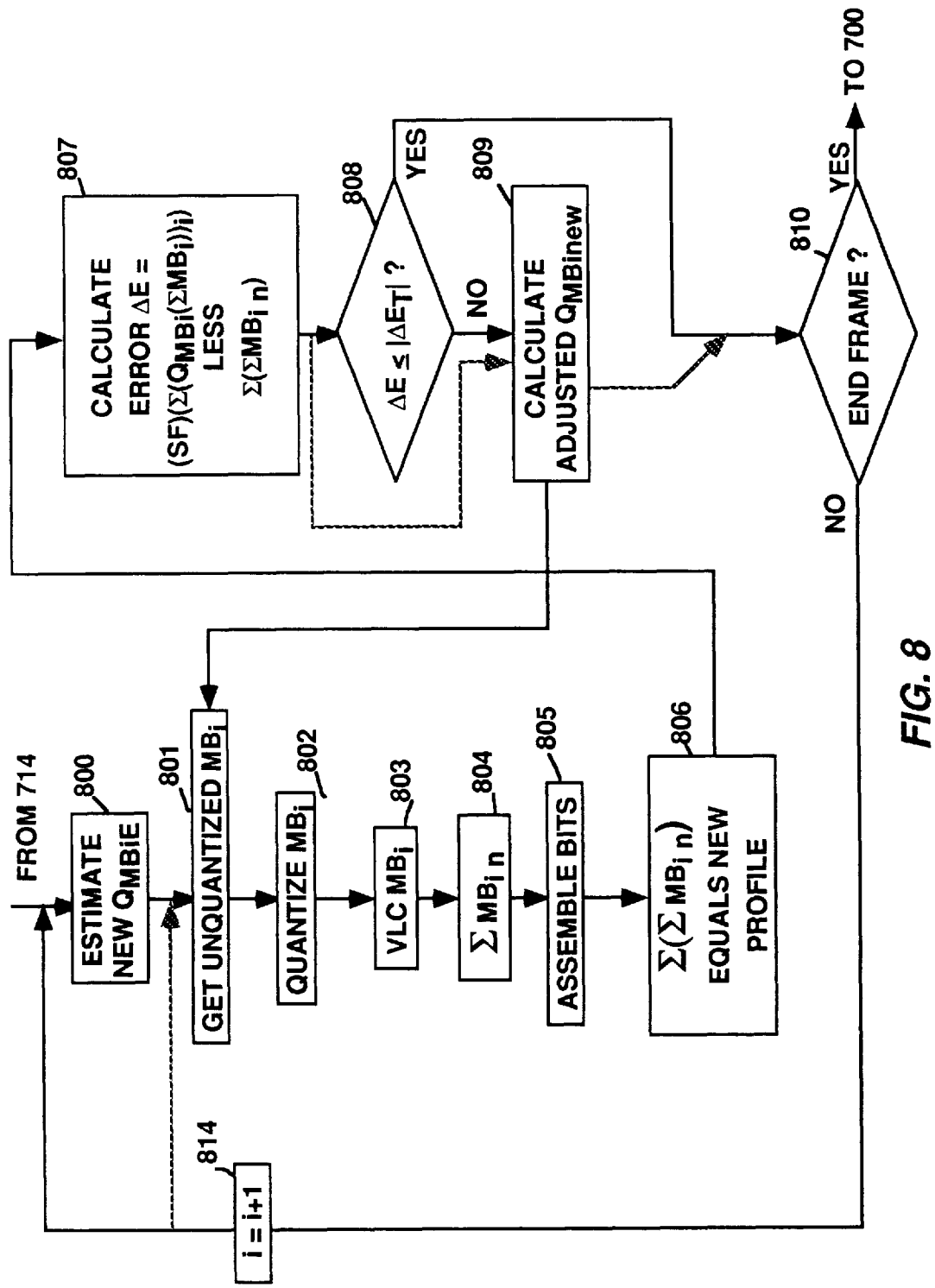

In FIG. 8 a new quantization factor $Q_{MBiE}$ for macroblock i is estimated {800}. The estimate may be obtained via a variety of methods. One method of obtaining the estimate is to form $Q_{MBiE}=(Q_{MBi})/(1-\%)$ where $Q_{MBi}$ is the original quantizing factor for macroblock i. Another method is simply to use the quantization factor $Q_{MBiE}=Q_{MBi-1}$ where $Q_{MBi-1}$ is the quantization factor generated for the previous macroblock i-1. A third method of estimating the quantization factor, $Q_{MBiE}$, is to use the final quantization factor, $Q_{MBiF}$, calculated for the corresponding macroblock of the last most previous like type frame.

After obtaining the estimate of the quantization factor for macroblock i, the unquantized macroblock is accessed {801} from the memory 39. Macroblock MBi is quantized {802} using the estimated quantization factor and it is variable length coded {803}. The new total of bits, $\Sigma MB_{in}$, for the macroblock, are summed {804}, and the codewords of the re-quantized macroblock are reassembled {805}. The sum of bits $\Sigma MB_{in}$ is summed {806} with the sums of bits of prior quantized macroblocks to form a profile value $\Sigma(\Sigma MB_{in)})_i$ for the current macroblock of the re-quantized recoded bit stream. Note that this profile is of bits and the scaled profile is described in terms of bits.

The difference between the new profile value $\Sigma(\Sigma MB_{in})_i$ and the original scaled profile value, $SF(\Sigma(Q_{MBi}(\Sigma MB_i))_i)$ is calculated {807} to generate a bit error value $\Delta E$, where $$\Delta E = \Sigma(\Sigma MB_{in}))_i - SF(\Sigma(Q_{MBi}(\Sigma MB_i))_i).$$

The error $\Delta E$ is compared with a threshold value $\Delta E_T$ {808}. If the error is greater than the threshold a new quantization factor $Q_{MBinew}$ is calculated {809}. An exemplary calculation for $Q_{MBinew}$ is according to a relationship of the form;

$$Q_{MBinew} = Q_{MBi} + sgn(\Delta E)$$

where $Q_{MBi}$ in the brackets corresponds to the last quantization factor used for the ith macroblock and is equal to $Q_{MBiE}$ in a first pass, and sgn($\Delta E$) is equal to ±1 for $\Delta E$ being positive and negative respectively. Macroblock i is reaccessed {801} and requantized using the new quantization factor. Steps {801–809} are iterated until the error $\Delta E$ is less than the threshold.

At step {808}, if the error is less than the threshold, a check {810} is made to determine if all of the macroblocks in the frame have been requantized. If they have not, the index i is incremented {814} and the requantization process for macroblock i+1 is initiated {800}. If they have then the system jumps to step 700 and processing of the next frame is initiated.

The foregoing process tends to rigidly track the profile and allows very little variation in the $Q_{MBi}$'s. The quantization factors are very uniform over a frame. Note for each subsequent processing pass for a particular macroblock, the data which was reassembled {805} for the prior processing pass of that macroblock is discarded. Only the reassembled data of the final pass is retained.

The dashed arrows, in FIG. 8 are included to describe another (preferred) embodiment which provides acceptable performance and is less computationally intensive. In this further embodiment, the $Q_{MBi}$'s tend to vary more resulting in a more uniform subjective image quality. In brief, this further embodiment is a one pass process wherein respective macroblocks are requantized with respective $Q_{MBi}$'s determined using the errors $\Delta E$ calculated for the respective previous macroblock.

In this further embodiment, at step {800} an estimated nominal quantizing factor is generated for only the first macroblock processed in the frame. An exemplary nominal quantizing factor $Q_N$ may be calculated according to the relationship $$Q_N = Q_{NL} + g(\Delta E)_L.$$

$Q_{NL}$ is the nominal quantizing factor used in the previous frame, $(\Delta E)_L$ is the error for the last macroblock in the previous frame and g is a gain factor. A nominal gain factor g is $31/B_{pp}$, where $$B_{pp} = \frac{\text{coding rate}}{\text{picture rate}}$$

For the very first frame to be processed the value $Q_N$ may be arbitrarily selected to equal a midrange quantizing factor. An alternative method of selecting a nominal quantizing factor for the first macroblock of each frame is to calculate the average of all of the new quantizing factors generated for respective previous frames.

Once the nominal quantizing factor $Q_N$ is calculated, macroblock $MB_1$ is accessed {801} from the memory 39 and quantized {802} using $Q_N$. Steps {803–807} are performed as described above. However in this embodiment step {808} is eliminated, and a new $Q_{MBnew}$ is calculated {809} regardless of the value of the error calculated in step {807}. The new quantizing factor is calculated according to the function $$Q_{MBnew} = (Q_{MBnew-1} + g(\Delta E))K$$

where $Q_{MBnew-1}$ is the value of $Q_{MBnew}$ calculated for the previous macroblock (is $Q_N$ for the first macroblock), and K is a scaling factor normally in the range of [0.5, 2.0] which reflects the amount of subjective toleration for quantization errors, and may be obtained from intracoding of macroblocks.

After the value of $Q_{MBnew}$ is calculated a check is made {810} to determine if the last macroblock in the frame has been processed. If it has not, the macroblock index i is incremented {814} and the next macroblock is accessed {801} from memory 39, and quantized {802} using the calculated value $Q_{MBnew}$. Steps {803–810} are performed and the next macroblock is processed etc. To review this embodiment, after the original profile is generated {700–714}, quantization is a single pass process where the corrected quantizing factor $Q_{MBi}$ determined with respect to each macroblock i at step {809} is used to quantize the subsequent macroblock i+1.

Figure 5:
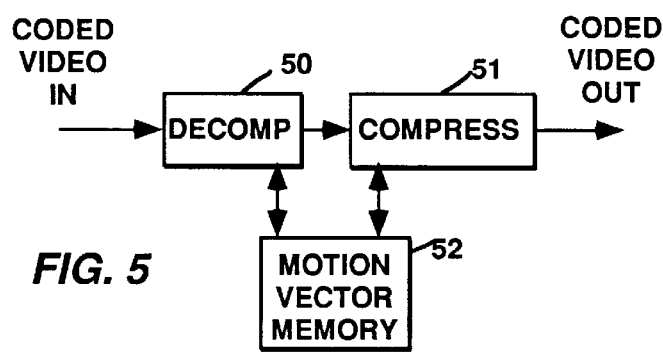

FIG. 5 illustrates a further bit scaling apparatus which requires considerable hardware to perform the bit scaling. In this apparatus the coded video signal is completely decompressed in a decompressor 50. However motion vectors for respective macroblocks are saved in a memory 52. The decompressed video signal is applied to a compressor 51 which re-compresses the video signal. The compressor 51 utilizes the motion vectors obtained from the original compressed video signal, hence the compressor 51 need not include motion vector calculating apparatus. The compressor 51 is programmed to produce a compressed bit stream at the desired bit rate. A bit profile may be generated to calculate a target value and applied to the rate controller within the compressor 51.

What is claimed is:

1. Apparatus for scaling a bit stream of a compressed video signal which has been compressed on a block basis, said apparatus including an analyzer for determining a block by block first cumulative profile of the volume of coded said compressed video signal over an image, and bit stream scaling apparatus responsive to said analyzer for generating a data reduced compressed video signal, having a block by block second cumulative volume profile of reduced data said second cumulative volume profile substantially corresponding to a linearly scaled version of said first cumulative profile.

2. The apparatus set forth in claim 1 wherein said compressed video signal is compressed, in part, using variable length coding and the data reduced compressed video signal is compressed, in part, using variable length coding, and wherein said analyzer comprises:

a connection for applying said compressed video signal;

a processor coupled to said connection for generating a sum $\Sigma MB_i$ representing a quantity of bits of respective said blocks of said compressed video signal and a further sum $\Sigma\Sigma MB_i$ corresponding to an accumulation of sums $\Sigma MB_i$ of blocks from a first block to block i, and for scaling, on a block by block basis, said sums $\Sigma\Sigma MB_i$ to produce said block by block second cumulative volume profile.

3. The apparatus set forth in claim 2 wherein said analyzer scales said sums $\Sigma\Sigma MBi$ for respective said blocks, and said bit stream scaling apparatus includes a means for eliminating the lattermost bits of respective blocks to reduce said compressed data, wherein the quantities of bits eliminated are determined for respective blocks according to a corresponding scaled sum $\Sigma\Sigma MBi$ to produce a linearly scaled bit stream having a profile similar to said scaled sum $\Sigma\Sigma MBi$ on said block basis.

4. A method for reducing bits in a bitstream of an MPEG coded video signal comprising:

forming cumulative sums representing the volume of said MPEG coded video signal, macroblock by macroblock, over an image to produce a macroblock by macroblock profile of accumulated data;

forming a further profile representing a linearly scaled version of said profile over an image;

processing said MPEG coded video signal on a macroblock by macroblock basis to produce further cumulative sums representing the volume of processed said MPEG coded video signal on a macroblock by macroblock basis that substantially conforms to said further profile on a macroblock by macroblock basis.

5. The method set forth in claim 4 wherein the step of processing comprises discarding, from respective blocks of respective macroblocks, codewords of lesser importance to image reproduction.

6. The method set forth in claim 4 wherein the step of processing comprises:

selecting respective codewords of said MPEG coded video signal from respective macroblocks and forming new cumulative sums of bits of ones of said codewords which were selected on a macroblock by macroblock basis; and terminating the selection of codewords for respective macroblocks when said new cumulative sums of bits are substantially equal to said cumulative sums of bits.

7. A method for reducing bits in a bitstream of an MPEG coded video signal comprising:

forming cumulative sums of bits of macroblocks of said MPEG coded video signal on a macroblock by macroblock basis over an image;

forming a scaled version of said cumulative sums;

inverse quantizing quantized codewords of said MPEG coded video signal;

quantizing inverse quantized codewords of said MPEG coded video signal with estimated quantizing parameters;

forming cumulative sums of bits of macroblocks of said MPEG coded video signal quantized with said estimated quantizing parameters;

determining new quantizing parameters, on a macroblock basis, as a function of differences between said scaled version of cumulative sums and said new sums;

quantizing inverse quantized codewords of said MPEG coded video signal with said new quantizing parameters such that cumulative sums of bits of macroblocks of reduced said MPEG coded video signal on a macroblock by macroblock basis are substantially equivalent to said scaled version of said cumulative sums.

8. The method set forth in claim 7 where in the step of forming cumulative sums comprises:

forming cumulative sums of bits of macroblocks of said MPEG coded video signal on a macroblock by macroblock basis using only bits which represent AC DCT coefficients; and forming a profile of accumulated data representing a linearly scaled profile of said cumulative sums of AC DCT coefficients; and wherein said step of quantizing includes:

processing said MPEG coded video signal such that cumulative sums of bits representing AC DCT coefficients of macroblocks of processed said MPEG coded video signal on a macroblock by macroblock basis have a profile which is substantially similar to said profile of accumulated data.

9. The method set forth in claim 8 wherein the step of forming a scaled version comprises:

calculating a target value for bits of AC DCT coefficients for respective frames responsive to total bits of said MPEG coded video signal for respective frames;

generating a scaling factor equal to a ratio of the target value divided by the cumulative sum for the last macroblock in a frame.

10. A method for reducing bits in a bitstream of an MPEG coded video signal comprising:

detecting quantizing values $Q_{MBi}$ associated with respective macroblocks of said MPEG coded video signal;

summing bits of respective codewords for respective macroblocks to form sums $\Sigma MBi$;

multiplying the sums $\Sigma MBi$; for respective macroblocks with their associated quantizing values to generate respective products $QMBi(\Sigma MBi)$ of bits summed times the quantizing value;

forming a scaled version of respective products; and processing said MPEG coded video signal such that cumulative sums of products of macroblocks of processed said MPEG coded video signal on a block by block basis are substantially equivalent to cumulative sums of scaled products.

11. The method set forth in claim 10 wherein the step of forming cumulative sums of bits of macroblocks of said MPEG coded video signal on a macroblock by macroblock basis further comprises, for respective macroblocks forming the sum of preceding and current said products.

12. The method set forth in claim 11 wherein the step of forming a scaled version of said cumulative sums comprises multiplying respective cumulative sums by a factor SF where $$SF = \frac{(1 - \%)(\Sigma\Sigma_{MBi})_{last} - \text{excess}}{\Sigma(Q_{MBi}(\Sigma MBi))_{last}}$$

and wherein % is a percentage of bits the bitstream of said MPEG coded video signal is to be reduced, $\Sigma\Sigma_{MBilast}$ corresponds to total bits in a frame, $\Sigma(Q_{MBi}(\Sigma_{MBi}))_{last}$ is a cumulative sum of products of respective quantizing factors times a corresponding sum of bits for respective macroblocks, and excess is an amount by which a previous frame exceeded a desired bit target.

13. A method for reducing bits in a bitstream of an MPEG coded video signal comprising:

obtaining an MPEG coded video signal;

forming cumulative sums of bits of macroblocks of said MPEG coded video signal on a macroblock by macroblock basis over an image;

forming a scaled version of said cumulative sums; then a) inverse quantizing quantized codewords of said MPEG coded video signal;

b) quantizing inverse quantized codewords of a first macroblock of said MPEG coded video signal with an estimated quantizing parameter;

c) forming a new sum of bits of said first macroblock quantized with said estimated quantizing parameter;

d) determining a new quantizing parameter as a function of differences between said scaled version of a cumulative sum for the current macroblock and said new sum;

e) quantizing inverse quantized codewords of a next subsequent macroblock of said MPEG coded video signal with said new quantizing parameter;

f) forming a new cumulative sum of bits of all preceding and said next subsequent macroblock quantized with said estimated quantizing parameter or said new quantizing parameter; and g) repeating steps d through f for all remaining macroblocks in a frame such that cumulative sums of bits of macroblocks of processed said MPEG coded video signal on a macroblock by macroblock basis are substantially equivalent to said scaled version of said cumulative sums.

* * * * *

UNITED STATES PATENT AND TRADEMARK OFFICE
CERTIFICATE OF CORRECTION

PATENT NO. : 5,889,561
DATED : March 30, 1999
INVENTOR(S) : Wilson Kwok, Joel Walter Zdepski and Huifang Sun It is certified that error appears in the above-identified patent and that said Letters Patent is hereby corrected as shown below:

On cover of patent, second column, delete [5,073,209  12/1991] and insert ---5,038,209  8/1991---.

On cover of patent, under U.S. PATENT DOCUMENTS, insert

---5,144,424  09/1992  Savatier ..................358/133

On cover of patent, insert ---OTHER PUBLICATIONS

Reduction of the bit-rate of compressed video while in its coded form by D. G. Morrison, M. E. Nilsson and M. Ghanbari, PV'94, D17.3, with Centre for Human Communications, BT Labs, Martlesham Heath, Ipswich IP5 7RE, UK.

DATA SELECTION STRATEGIES FOR DIGITAL VCR LONG PLAY MODE by Jill M. Boyce with Hitachi America Advanced Television & Systems Laboratory, IEEE Transactions on Consumer Electronics, Vol. 40, No. 3, August 1994.---

Signed and Sealed this

Twenty-seventh Day of March, 2001

*Attest:*

NICHOLAS P. GODICI

*Attesting Officer*     *Acting Director of the United States Patent and Trademark Office*